Feb. 6, 1940. F. R. EICHNER 2,189,138
RUBBER MOUNTING
Filed June 3, 1938
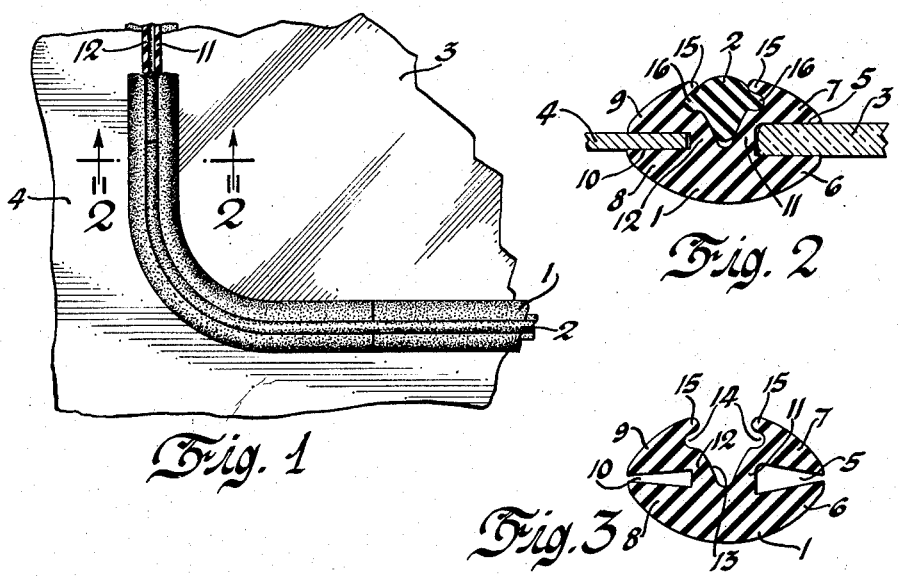
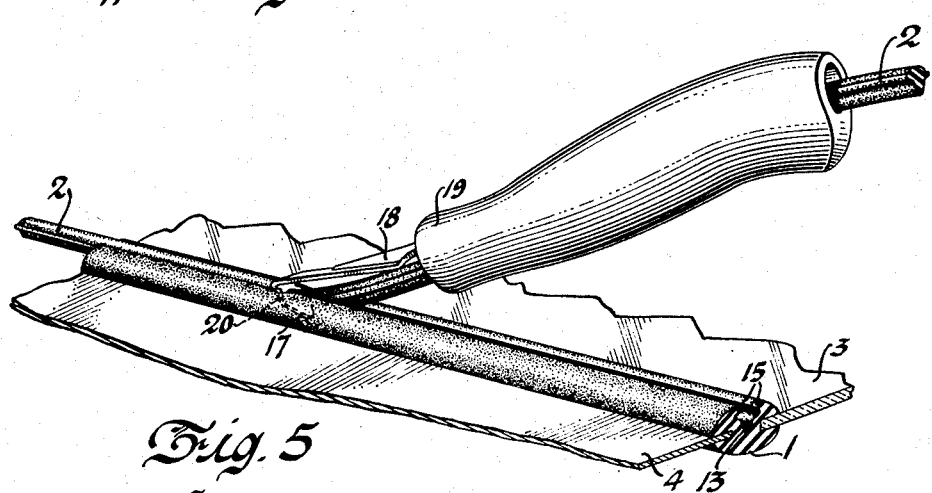
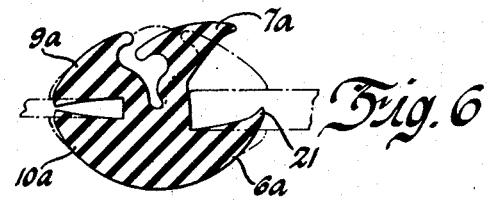
Inventor
Ferdinand R. Eichner
By Blackmore, Spence & Flint
Attorneys Patented Feb. 6, 1940

2,189,138

UNITED STATES PATENT OFFICE 2,189,138

RUBBER MOUNTING

Ferdinand R. Eichner, Pontiac, Mich., assignor to Yellow Truck & Coach Manufacturing Company, Pontiac, Mich., a corporation of Maine Application June 3, 1938, Serial No. 211,549

13 Claims. (Cl. 20—56)

This invention relates to the joining in edge to edge relation of sheet panels. It will be useful for mounting a pane of glass in an opening of a sheet metal panel and should be of particular interest to the transportation industry in that it provides an inexpensive weatherproof joint and cushion mounting for window glass.

In its preferred embodiment the joint consists merely of two interfitting rubber strips, one of which has edge receiving recesses and overlaps both sides of the edge portions of adjacent panels to be joined and is locked in tight gripping engagement with the edge portions by its reception of the other strip in wedging relation thereto. The two strips are separately formed by well well known extruding or molding processes and can be supplied in long lengths from which the proper amount is cut off as desired, either before or at the time of installation. For the ordinary installation where the corners of the windows are rounded the strip can run continuously around the window with the opposite ends brought together. Alternately several sections could be used. The supporting panel can be painted or finished prior to the installation of the window and the rubber mounting may be painted or molded in color in harmony or contrast with the finish of the supporting panel.

An important advantage of the mounting is that extreme care in fitting parts is not required since the edge receiving strip is held under stress and its deformation compensates for slight inaccuracies while affording a secure and weatherproof attachment, which also cushions shock and relieves the glass from breaking strains. Should breakage occur replacement of the glass is an easy and simple matter. There are no fastening screws nor metal attachment moldings and as compared to the customary window installation the number of parts is greatly reduced with a consequent saving in weight and a more compact and neater appearing smooth assembly which will last for the life of the ordinary transportation carrier.

For a better explanation of the invention reference is made to the accompanying drawing wherein Figure 1 is a side elevation partly in section, showing a portion of a window mounted in accordance with the invention in a supporting sheet panel; Figure 2 is an enlarged sectional view taken on line 2—2 of Figure 1; Figure 3 is a detail view of the main mounting strip prior to its use; Figure 4 is a perspective view showing the eye of a hand tool by which the wedging strip is applied; Figure 5 is a perspective view illustrating the use of the tool in applying the wedging strip, and Figure 6 is a sectional view of a slightly modified form of mounting strip.

In the drawing the numeral 1 indicates the mounting strip proper and its associated and separately formed filler strip is shown at 2. Both strips are formed of elastic deformable material, such as medium soft anti-oxidizing rubber. For some installations the filler strip 2 may be of medium hard rubber since its purpose primarily is that of a spreader. For mounting the window panel 3 in the opening of the metal wall panel 4 the adjoining edges are spaced apart slightly and the strip 1 extends in the space between the edges and overlaps the edge portions of the panels on both sides, as seen in Figure 2. Accordingly the strip 1 is formed with a groove 5 to receive the edge of the pane 3 and which groove is constituted by the spaced wings 6 and 7, there being a similar pair of wings 8 and 9 spaced apart to provide a groove 10 for the reception of the panel 4. The width of the groove is preformed in accordance generally with the width of the panel to be received therein but in the formed shape as seen in Figure 3 the sides of the groove diverge inwardly or in other words the width of the groove near its base is greater than near the mouth of the groove. This arrangement insures a snug initial fit of the parts inasmuch as the wing portions spread apart slightly upon the insertion of the panel therein which stresses the material of the wings and the elasticity of the material results in a firm grip of the panel. The wing portions 7 and 9 are in the nature of enlarged heads carried by the narrow neck portions 11 and 12 which are capable of being bent to some extent when the heads 7 and 9 are spread apart or moved together, as will be referred to. The spaced apart headed necks 11 and 12 provide therebetween a longitudinal groove or recess 13 of substantially V-shape, the side walls of which are provided with grooves 14—14 beneath the overhanging lips or ridges 15—15. The grooves 14 and overhanging lips 15 are intended for interlocking reception of a pair of beads 16—16 on opposite sides of the triangular shaped filler strip 2 upon the insertion of the filler strip in the groove 13, as is illustrated in Figure 2.

When the corners of the window 3 and window receiving opening in the panel 4 are curved, as seen in Figure 1, a single length of mounting strip encircles the edge of the glass and the installation of the parts may be accomplished in various ways. According to one method the mounting strip is first applied to the edge of the glass and then brought into alignment with the window opening in the panel 4 whereupon the groove 10 is opened out by crowding the wing 9, the necessary bending occurring primarily in the region of the neck 12 enabling the wing to be slid through the window opening for release on the far side of the edge portion of the panel. It may be noted at this point that the panel edge portion requires no working or preformation of any kind and consists simply of the flat sheet from which the window opening has been cut out. To complete the installation the filler strip 2 is inserted within the groove 13 so as to hold the wings 7 and 9 spread apart. In addition to holding the wings against inward collapse the arrangement of the filler strip is such that it imposes a compressive force on the wings to insure a snug fit and waterproof seal between the parts. The interlocking formations 15 and 16 hold the filler strip against accidental displacement.

To facilitate insertion of the filler strip a special hand tool has been devised which includes the groove spreading eye 17 projecting laterally from the mounting strap 18 carried by the hollow handle 19. The aperture through the eye 17 is shaped to conform with the cross section of the filler strip 2 to hold the same against twisting and the eye is also pointed at its end for easy insertion into the groove, the sides of the eye having bulges at 20 which tend to open up the lips 15—15. The filler strip 2 is threaded through the hollow handle and then passed through the eye 17 so that upon insertion of the eye into the groove the filler strip is brought into position as the tool is drawn through the groove. The deposit of the filler strip through the use of the tool may be done very rapidly and the speed of application may be likened to the operation of the well known Zipper or hookless fastener.

Removal of the filler strip for disassembly of the parts is also a simple matter and may be effected by prying out a portion of the strip with a screw driver or similar tool and then ripping out the rest of the strip. A special tool, not illustrated, has been devised for the removal of the filler and which for the present purpose may be referred to as a hooked rod somewhat in the nature of a buttonhook which can be turned under the filler strip and then drawn along the groove to lift the strip out.

In the modification shown in Figure 6 the assembled relation of the strip is illustrated by broken lines while the solid lines show the shape of the extruded mounting strip prior to its installation and use. In its original form the wing 6a terminates in an inturned thin lip 21, the deformation of which insures a snug fit to the glass windowpane at the edge of the mounting strip. In this instance the glass receiving space or channel is initially wider than in the design heretofore described or in other words the channel space is greater between the wings 6a and 7a with the wing 7a formed or extruded in the opened out relation illustrated. This is done to facilitate installation of the glass after the wings 9a and 10a are fitted to the wall panel. Alternately the wing 9a could be preformed in opened out position in the event the mounting strip is to be applied to the windowpane and then fitted to the supporting wall panel. In either event the wings 9a and 7a are spread apart and held under compressive stress by the introduction of the interlocking wedge or filler strip as previously described. By installing the filler strip so that its abutting ends are offset from the abutting ends of the mounting strip as seen in Fig. 1 the ends of each strip in effect are tied together by the other strip and held against displacement.

While for the purpose of disclosure the invention has been specifically described, it will be obvious that the mounting is usable as a connection between various types of parts as, for example, the mounting of a speedometer or other instrument in a supporting panel. In the manufacture of motor coaches, where on customer specification a special ventilator must be installed in the body wall, its installation by means of the present invention can be quickly and easily made by simply cutting an opening of proper size in the body panel and then securing therein the ventilator assembly by fitting the mounting strip to the adjacent edges of the assembly and the panel as previously described. Additional uses will readily suggest themselves.

I claim:

1. In combination, a cushion mounting strip formed of elastic deformable material and adapted to engage adjacent edge portions on one side of parts to be joined, a pair of lateral projections integral with the strip comprising narrow neck portions spaced apart and terminating in headed portions to engage on the other side of the edge portions and a spreader insertable between said headed portions to place the elastic deformable material in said headed portions under compressive stress.

2. In combination, a rubber strip adapted to engage adjacent edge portions on one side of parts to be joined, a pair of preformed rubber wings projecting from said strip for cooperation therewith in providing edge receiving grooves and a separately formed filler detachably fitted between said wings in offset relation to the plane of the grooves to squeeze the rubber on both sides thereof between the opposing faces of the filler and said parts for a groove constricting tendency.

3. The combination with a pair of panels having their edges adjacent each other, of a rubber strip having a pair of grooves to receive the edge portions of the panels, said strip on one side of the panels being formed as a pair of spaced arms, a rubber filler strip insertable in the space between said arms to squeeze the rubber in the arms in the regions between the panel faces and the inserted filler strip, and interlocking formations on said arms and filler strip.

4. The combination with a pair of sheets arranged in edge to edge relation of a rubber joining strip overlapping the adjacent edge portions of the sheets on one side thereof and having a portion extending between the sheet edges and terminating in a pair of spaced wings in overlapping relation to the edge portions of the sheets on the other side thereof and a wedging member insertable between said wings to spread the same into tight gripping engagement with the sheets and hold the rubber in the wings under squeezing stress.

5. A fastening for a pair of sheets comprising a strip of elastic deformable material having a pair of grooves to receive the adjoining edges of the sheets to be joined and having in addition a wedge receiving depression and a wedging element insertable in said depression to squeeze said material for constriction of the grooves.

6. An attachment device for the adjoining edges of a pair of panels, including a strip of rubber shaped to fit between the edges and to overlap both sides of the edge portions of the panels, said strip having a V-shaped opening in the medial portion thereof and a substantially triangular sectioned rubber wedge removably fitted to said V-shaped opening for a squeezing action on the rubber of said strip.

7. For cushion mounting a windowpane in an opening of a rigid supporting panel, a rubber moulding strip adapted to encircle a windowpane with its opposite ends brought together, said strip having an inwardly opening channel for removable reception of the peripheral edge of the windowpane, an outwardly opening channel for removably receiving the edge of the supporting panel which defines the window opening, and a laterally opening channel for interlocking engagement with a wedging insert, and a wedging insert strip of rubber removably fitted to the last mentioned channel to crowd the material on either side thereof into tighter fitting relation with the panels and brought end to end at a point spaced from the adjacent ends of the moulding strip.

8. The combination with a rigid supporting panel and a rigid panel to be supported of a connector strip formed of rubber with a pair of spaced grooves detachably fitted to adjacent edges of the panels for connecting and supporting one from the other and means crowding the rubber for a tight fit with the panels and comprising a rubber spreader strip removably received within the body of the connector strip.

9. In combination, a rigid supporting panel having a window opening therein, a cushion window moulding strip having an outwardly opening groove embracing the edge of said window opening and otherwise unsecured thereto, a window glass having its edge fitted within an inwardly opening groove in the cushioning strip and a rubber filler inserted in the body of the strip to stress the same for closing said grooves against displacement therefrom of the panel and glass, respectively.

10. A cushioning connector comprising a formed rubber strip having longitudinal channels to receive adjacent edge portions of parts to be connected, a flexible rubber spreader insertable within another channel of the rubber strip to crowd the rubber for a tight fit to the edge portions and interlocking formations to retain the rubber spreader against displacement.

11. A connector of the class described, including a formed rubber strip having a longitudinal groove to embrace the edge of a part to be connected and an expansible groove for the reception of an interlocking spreader and a rubber spreader insertable in the expansible groove to crowd the rubber of said strip in the region of the edge embracing groove.

12. A cushioning connector for joining adjacent edge portions of juxtaposed parts, including a molded rubber strip having a bead portion to overlap the edge portions on one side thereof, a projecting neck portion to extend between the edges and a pair of spaced L-sectioned bead portions carried by the neck portion to overlap the edge portions on the other side thereof with their projecting legs extending toward one another and constituting lips at the space between said bead portions, and a rubber spreader strip insertable within said space in interlocking relation with said lips to distribute squeezing pressure on said L-sectioned beads between the spreader strip and the overlapped edge portions.

13. A cushioning connector of the class described comprising a molded rubber strip having a neck portion connecting a head on one side and a pair of spaced legs on the other side, one of said legs cooperating with the head to form a close mouthed channel and the other leg cooperating with the head to form a wide mouthed channel and a molded rubber spreader strip insertable between said legs and first bending the last mentioned leg in the region of said neck to decrease the width of said wide mouthed channel and additionally squeezing the material in both legs for a constricting tendency in both channels.

FERDINAND R. EICHNER.